United States Patent [19]

Wang et al.

[11] Patent Number: 4,778,863

[45] Date of Patent: Oct. 18, 1988

[54] PREPARATION OF EPOXY RESINS HAVING LOW UNDESIRABLE HALOGEN CONTENT

[75] Inventors: Chun S. Wang; Zeng-kun Liao, both of Lake Jackson, Tex.

[73] Assignee: The Dow Chemical Company, Midland, Mich.

[21] Appl. No.: 85,035

[22] Filed: Aug. 13, 1987

[51] Int. Cl.$^4$ .................. C08G 59/06; C08G 59/08; C07D 301/27

[52] U.S. Cl. .................. 525/507; 525/385; 525/534; 528/89; 528/90; 528/93; 528/95; 528/405; 549/514; 549/515; 549/516; 549/517

[58] Field of Search .................. 528/89, 90, 93, 95, 528/405; 549/514, 515, 516, 517; 525/507, 534, 385

[56] References Cited

U.S. PATENT DOCUMENTS

| | | | |
|---|---|---|---|
| 2,848,435 | 8/1958 | Griffin et al. | 260/47 |
| 3,121,727 | 2/1964 | Baliker, Jr. et al. | 260/348.6 |
| 3,145,191 | 8/1964 | Perfetti | 260/47 |
| 3,305,528 | 2/1967 | Wynstra et al. | 528/95 |
| 3,553,165 | 1/1971 | Kiryu | 528/95 |
| 3,766,221 | 10/1973 | Becker | 260/348.6 |
| 4,132,718 | 1/1979 | Vargiu et al. | 260/348.15 |
| 4,269,952 | 5/1981 | Locatelli | 528/95 X |
| 4,273,915 | 6/1981 | Soula et al. | 528/93 |
| 4,383,118 | 5/1983 | Locatelli et al. | 528/111 X |
| 4,447,598 | 5/1984 | Caskey et al. | 528/489 |
| 4,448,948 | 5/1984 | Tsubaki et al. | 528/95 |
| 4,499,255 | 2/1985 | Wang et al. | 528/95 |
| 4,585,838 | 4/1986 | Wang et al. | 525/507 |
| 4,624,975 | 11/1986 | Pham | 523/453 |

FOREIGN PATENT DOCUMENTS 952357 3/1964 United Kingdom .
2120659B 12/1983 United Kingdom .

Primary Examiner—Earl Nielsen

[57] ABSTRACT

Glycidyl derivatives of compounds containing —OH, —NH$_2$ and/or —COOH groups are prepared by reacting in the presence of a mixture of solvents, at least one of which is a polar aprotic solvent, an excess of an epihalohydrin with a compound containing —OH, —NH$_2$ and/or —COOH groups while continuously or incrementally adding an alkali metal hydroxide to the mixture and removing water from the reaction by codistillation with epihalohydrin and the solvents.

31 Claims, No Drawings

PREPARATION OF EPOXY RESINS HAVING LOW UNDESIRABLE HALOGEN CONTENT

FIELD OF THE INVENTION

The present invention pertains to the preparation of glycidyl ethers.

BACKGROUND OF THE INVENTION

The preparation of glycidyl derivatives by the reaction of an aromatic hydroxyl-containing compound with epihalohydrin in the presence of a base is well known as disclosed by Lee and Neville in HANDBOOK OF EPOXY RESINS, McGraw-Hill, 1967. Because of increased demand of high purity resins by the electronic industry, it has become more desirable to manufacture epoxy resins of high purity which contain little or essentially no total chloride, i.e. little or essentially no hydrolyzable chloride or bound chloride. In some instances, halogens, particularly bromine attached to the aromatic rings are desirable, and these are not included in reference to total chloride.

SUMMARY OF THE INVENTION

The present invention pertains to an improvement in a process for the preparation of glycidyl derivatives of compounds containing at least one —OH, —NH$_2$ or —COOH group per molecule, which process comprises reacting at least one compound having at least one —OH, —NH$_2$ or —COOH group per molecule with an excess of at least one epihalohydrin in the presence of an alkali metal hydroxide and an organic solvent and continuously removing water from the reaction mixture by codistilling or azeotroping with the epihalohydrin and solvent; wherein the improvement resides in conducting the reaction in the presence of a mixture of solvents which codistill with the water and epihalohydrin, at least one of which solvents is a polar aprotic solvent and wherein the amount of polar aprotic solvent employed is suitably from about 5 to about 80 percent by weight of the total amount of solvents employed.

The present invention also pertains to an improvement in a process for the preparation of glycidyl derivatives of compounds containing at least one —OH, —NH$_2$ or —COOH group per molecule, which process comprises reacting at least one compound having at least one —OH, —NH$_2$ or —COOH group per molecule with an excess of at least one epihalohydrin in the presence of an alkali metal hydroxide while (1) conducting the reaction in the presence of an organic solvent which does not react with any of the components in the reaction mixture and which codistills with water and said epihalohydrin at a boiling point below the boiling point of the lowest boiling compound among the components in the reaction mixture;

(2) conducting the reaction under a reduced pressure sufficient to provide a distillate with a boiling point suitably from about 30° C. to about 90° C.

(3) employing said alkali metal hydroxide as an aqueous solution and adding said aqueous alkali metal hydroxide in a continuous or intermittent manner over a period of time suitably from about 0.5 to about 20 hours;

(4) maintaining the temperature after completion of the addition of aqueous alkali metal hydroxide for a time such that the concentration of —OH, —NH$_2$ and/or —COOH groups remaining in the reaction mixture is suitably not greater than about 1 percent by weight based upon the total weight of —OH, —NH$_2$ and/or —COOH groups contained in the reactants containing —OH, —NH$_2$ and/or —COOH groups;

(5) continuously removing water by means of codistillation at a rate such that the water content in the reaction mixture is suitably less than about 6 percent by weight based upon the weight of the reaction mixture;

(6) separating the water from the distillate and returning the solvent and epihalohydrin to the reaction mixture; and (7) subsequently recovering the resultant glycidyl derivative by conventional means;

wherein the improvement resides in conducting the reaction in the presence of a mixture of solvents which codistill with the water and epihalohydrin, at least one of which solvents is a polar aprotic solvent and wherein the amount of polar aprotic solvent employed is suitably from about 5 to about 80 percent by weight of the total amount of solvents employed.

Another aspect of the present invention pertains to an improvement in a process for the preparation of glycidyl ether derivatives which process comprises (A) continuously or incrementally adding an aqueous alkali metal hydroxide solution over a period of from about 0.5 to about 20 hours to a mixture containing (1) at least one compound having at least one —OH, —NH$_2$ and/or —COOH group per molecule, (2) at least one epihalohydrin and (3) an organic solvent which codistills with water and epihalohydrin at a temperature below the boiling point of the lowest boiling compound among the components in the reaction mixture at the pressure employed or an organic solvent which has a boiling point above the temperature at which epihalohydrin and water codistill at the temperature and pressure employed;

(B) conducting the reaction under a reduced pressure sufficient to provide a distillate with a boiling point of from about 30° C. to about 90° C., while continuously removing water by means of codistillation with epihalohydrin and solvent at a rate such that the water content in the reaction mixture is less than about 6 percent by weight;

(C) separating the water from the distillate and returning the epihalohydrin and organic solvent to the reaction mixture;

(D) drying the reaction mixture until the concentration of water is equal to or less than about 3 percent by weight;

(E) removing any insoluble materials from the reaction mixture by any suitable mechanical solid separation means thereby forming a resin/epihalohydrin/organic solvent mixture essentially free of insoluble material;

(F) washing the resin/epihalohydrin/organic solvent material with water so as to remove water soluble materials;

(G) drying the resin/epihalohydrin/organic solvent mixture to a water content equal to or less than about 3 percent by weight; and (H) recovering the resultant epoxy resin from the resin/epihalohydrin/organic solvent mixture by any suitable means; and wherein the improvement resides in employing as the solvent for the reaction, a mixture consisting of (1) from about 20 to about 95 percent by weight of at least one solvent selected from the group consisting of (a) ketones, (b) glycol ethers, (c) glycol ether acetates, (d) aromatic hydrocarbons, (e) aliphatic hydrocarbons and (f) any combination of any two or more of such solvents; and (2) from about 5 to about 80 percent by weight of at least one polar aprotic solvent.

DETAILED DESCRIPTION OF THE INVENTION

Hydrolyzable halide is defined herein as any combination of halogen and hydroxyl groups attached to adjacent carbon atoms. Bound halide is defined herein as any aliphatic halides attached to a carbon atom which is not adjacent to a carbon atom having a hydroxyl group attached thereto. Total halide is defined herein as hydrolyzable halide plus bound halide.

In some instances, it is desirable for the resin to contain halogen atoms, particularly bromine atoms, but these halogen atoms are attached to an aromatic ring. These halogen atoms which are attached to the aromatic ring are not considered a part of the total halogen content as defined herein.

The reaction is conducted under reduced pressure so as to form a co-distillate of water, epihalohydrin and the organic solvent mixture at the desired reaction temperature. The reaction temperature is suitably from about 30° C. to about 90° C., more suitably from about 30° C. to about 85° C., most suitably from about 35° C. to about 65° C.

If the reaction is conducted at temperatures below about 35° C., the time required to complete the reaction becomes excessive and it becomes difficult to condense and manage the distillate in a manner conducive to optimum reaction composition.

If the reaction is conducted at temperatures above about, 90° C., large amounts of insoluble polymers are formed, raw material yields are lowered and processing difficulties occur.

If the reaction is conducted such that the concentration of water in the reaction mixture exceeds about 6 percent by weight, hydrolysis of the epihalohydrin becomes dominant and a product very high in hydrolyzable halide is obtained and epihalohydrin yields are decreased.

If the insoluble materials are removed from the resin-/epihalohydrin/organic solvent composition containing more than about 2% water by weight, the inorganic salt and alkali metal hydroxide do not readily precipitate and the hydrolyzable chloride content of the product would be high due to the reverse reaction of resin, salt and water.

If the insoluble materials are not removed from the resin/epihalohydrin/organic solvent composition prior to water washing and removal of the epihalohydrin and organic solvent, the hydrolyzable halide content of the product tends to increase, water washing and phase separation is more difficult, distillation equipment tends to become fouled with solid deposits, raw material yields tend to decrease and product quality becomes difficult to control.

The insoluble materials which are removed in the step identified as (E) are usually unreacted alkali metal hydroxide, by-product salts, epihalohydrin polymers and resin polymers The insoluble materials can be removed by any suitable mechanical means such as, for example, filtration, centrifugation, combinations thereof and the like.

The reaction, as previously stated, is conducted for a time sufficient to reduce the content of the active halogen-containing reactant, the aromatic hydroxyl-containing compound and the aromatic primary or secondary amine, suitably to an amount which is not greater than about 1, more suitably not greater than about 0.5, most suitably not greater than about 0.3, percent by weight based upon the total weight of —OH, —NH$_2$ and/or —COOH groups contained in the reactants containing —OH, —NH$_2$ and/or —COOH groups. This can easily be determined by periodically taking samples from the reaction vessel and analyzing them for the aromatic —OH, —NH$_2$ and/or —COOH content.

The epihalohydrin can be employed in an amount of at least about 1, suitably from about 2 to about 20, more suitably from about 4 to about 12, most suitably from about 6 to about 12, molar excess of epihalohydrin above that required to react stoichiometrically with the active hydrogen-containing material.

Suitable epihalohydrins which can be employed herein include, for example, those represented by the following Formula I

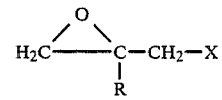

FORMULA I wherein R is hydrogen or a lower C$_1$ to C$_4$ alkyl group and X is a halogen, preferably chlorine or bromine. Particularly suitable epihalohydrins include, for example, epichlorohydrin, epibromohydrin, epiiodohydrin, methylepichlorohydrin, methylepibromohydrin, methylepiiodohydrin, combinations thereof and the like. The epihalohydrin is suitably employed in amounts which provide a ratio of moles of epihalohydrin per aromatic hydroxyl, amine hydrogen atoms or carboxyl groups employed of from about 2:1 to about 30:1, more suitably from about 2:1 to about 20:1, most suitably from about 4:1 to about 15:1.

Suitable alkali metal hydroxides which can be employed herein include, for example, sodium hydroxide, potassium hydroxide, lithium hydroxide, or combinations thereof. The alkali metal hydroxide is usually employed as an aqueous solution in a concentration of from about 10 to about 60, suitably from about 20 to about 55, more suitably from about 30 to about 50, most suitably from about 40 to about 50, percent by weight. The aqueous alkali metal hydroxide is suitably added over a period of from about 0.5 to about 20, more suitably from about 2 to about 15, most suitably from about 4 to about 12, hours. The alkali metal hydroxide is usually employed in an amount which corresponds suitably to from about 0.8 to about 1.5, more suitably from about 0.8 to about 1.2, most suitably from about 0.9 to about 1 mole of alkali metal hydroxide per aromatic hydroxyl group, amine group and/or carboxyl group employed. The alkali metal hydroxide is added either continuously or intermittently, but never is it added in one increment.

Suitable compounds which can be employed to react with the epihalohydrin to prepare the corresponding epoxy compounds include, for example, phenols, bisphenols, novolac resins, polyvinyl phenols, the corresponding amine-containing and carboxyl-containing materials. Suitable such compounds include but are not limited by those represented by the following formulas II–VII

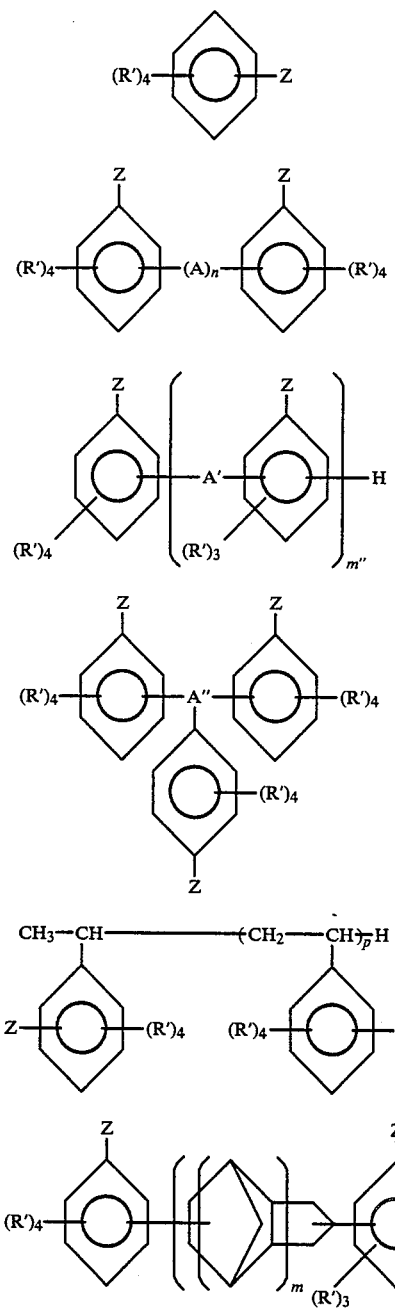

FORMULA II

FORMULA III

FORMULA IV

FORMULA V

FORMULA VI

FORMULA VII wherein each A is independently a divalent hydrocarbon group having from 1 to about 12, preferably from 1 to about 6 carbon atoms, —O—, —S—, —S—S—, —SO—, —SO$_2$— or —CO—; A' is a divalent hydrocarbon group having from 1 to about 12, preferably from 1 to about 6, carbon atoms; A" is a trivalent hydrocarbon group having from 1 to about 12, preferably from 1 to about 6, carbon atoms; each R' is independently hydrogen, a hydrocarbyl group having from 1 to about 10, preferably from 1 to about 4, carbon atoms, a halogen atom, preferably chlorine or bromine, an —OH, —NH$_2$ or —COOH group; each Z is independently an —OH, —NH$_2$ or —COOH group; m has an average value of from 1 to about 5; m' has an average value of from 1 to about 10; m" has a value from about 1 to about 6 and n has a value of zero or 1; p has an average value of from about 1 to about 100, preferably from about 2 to about 50.

The cyclopentadiene and oligomer hydroxyl-containing compounds (those represented by formula VII) and methods for their preparation can be found in U.S. Pat. No. 4,390,680 issued to Donald L. Nelson on June 29, 1983 which is incorporated herein by reference. The corresponding —NH$_2$ and —COOH compounds can be prepared in a similar manner by substituting an aromatic ring or an aromatic acid for the phenolic compound.

Also, suitable are compounds containing both at least one aromatic hydroxyl group and at least one aromatic amine group such as, for example, hydroxy aniline, aminoxylenol and the like.

Particularly suitable aromatic compounds which are employed to react with the epihalohydrin to form the glycidyl derivatives include, for example, the phenol-formaldehyde resins, the cresol-formaldehyde resins, cyclopentadientyl oligomer-phenol resins, bisphenol A and the like. Also suitable are the aromatic ring substituted halogen derivatives thereof.

Suitable polar aprotic solvents which can be employed herein include, for example, dimethyl sulfoxide, dimethyl acetamide, N-methylpyrrolidinone, dimethyl formamide, dimethylsulfone, tetramethyl urea, hexamethyl phosphoramide, tetramethylenesulfone, combinations thereof and the like. Any such solvent can be employed so long as it does not react with the components of the reaction mixture and has a boiling point such that it is not totally removed during codistillation of the water, epihalohydrin and solvents.

The other solvent employed in addition to the polar aprotic solvent can include such solvents as ketones, primary, secondary and tertiary alcohols, glycol monoethers, glycol ether acetates, aromatic hydrocarbons, aliphatic hydrocarbon having from 6 to about 12 carbon atoms, combinations thereof and the like. Any such solvent can be employed so long as it does not react with the components of the reaction mixture and has a boiling point such that it is not totally removed during codistillation of the water, epihalohydrin and solvents. Particularly suitable such solvents include, 1-methoxy-2-hydroxy propane, 1-butoxy-2-hydroxy ethane, tert-amyl alcohol, tert-hexyl alcohol, 1-isobutoxy-2-hydroxy propane, 1-phenoxy-2-hydroxy propane, cyclohexanol, ethylene glycol monomethyl ether acetate, methyl ethyl ketone, methyl isobutyl ketone, combinations thereof and the like.

The solvents are employed in amounts such that the total amount of solvent is suitably from about 10 to about 100, more suitably from about 20 to bout 70, most suitably from about 30 to about 60, percent by weight based upon the weight of the epihalohydrin. Within the solvent mixture, the polar aprotic solvent is suitably employed in amounts which corresponds suitably to from about 5 to about 80, more suitably from about 10 to about 65, most suitably from about 15 to about 50, percent by weight of the total solvent mixture.

The epoxy resins prepared by the process of the present invention are particularly suitable for use in electrical and electronic applications where the total halogen content needs to be as low as possible. This is particularly true in encapsulated electronic components such as in microchips and the like.

The following examples are illustrative of the invention, but are not to be construed as to limiting the scope thereof in any manner.

EXAMPLE 1

Into a 2-liter reaction vessel equipped with temperature and pressure control and indicating means, means for condensing and separating water from a co-distillate mixture of water, epichlorohydrin and solvents is added a cresol-formaldehyde novolac resin having an average aromatic hydroxyl functionality of 6, epichlorohydrin and solvents in the amounts indicated in Table I. After stirring at room temperature and atmospheric pressure to thoroughly mix the contents, the temperature is raised to about 35° C. to about 50° C. and the pressure is reduced in order to provide the co-distillate with a boiling point as indicated in Table I. To the resultant solution is continuously added a 50% aqueous sodium hydroxide solution over a period of time as indicated in Table I. During the addition of the sodium hydroxide solution, the water is removed by co-distilling with epichlorohydrin and the solvents. The distillate is condensed, thereby forming two distinct phases, an aqueous phase (top) and an organic epichlorohydrin-solvents phase (bottom). The bottom layer is continuously returned to the reaction vessel. After finishing the addition of the sodium hydroxide solution, the mixture is digested at the boiling point for about 20 to 30 minutes. The salt is then removed by filtration, the excess epichlorohydrin and solvents are removed by distillation under vacuum. The resulting epoxy resin is dissolved in a 50/50 by weight mixture of methyl ethyl ketone/toluene. This epoxy resin-solvent mixture is washed with water successively to remove any remaining salt and is subsequently distilled to provide the epoxidized cresol-formaldehyde novolac resin. The results are given in Table I.

comprises reacting at least one compound having at least one —OH, —NH$_2$ or —COOH group per molecule with an excess of at least one epihalohydrin in the presence of an alkali metal hydroxide and an organic solvent and continuously removing water from the reaction mixture by codistilling or azeotroping with the epihalohydrin and solvent; the improvement which comprises conducting the reaction in the presence of a mixture of solvents which codistill with the water and epihalohydrin, at least one of which solvents is a polar aprotic solvent and wherein the amount of polar aprotic solvent employed is suitably from about 5 to about 60 percent by weight of the total amount of solvents employed.

2. A process of claim 1 wherein
 (a) said epihalohydrin is employed in an amount which corresponds to from about 2 to about 30 moles of epihalohydrin per —OH, amine hydrogen atom or —COOH group;
 (b) the reaction is conducted under a reduced atmosphere such that the distillate has a boiling point of from about 35° C. to about 65° C.;
 (c) the alkali metal hydroxide is employed as an aqueous solution having a concentration of from about 10 to about 60 percent by weight and is added over a period of from about 2 to about 15 hours;
 (d) the polar aprotic solvent is present in an amount which comprises from about 10 to about 65 percent by weight of the total weight of solvent present in the reaction mixture; and
 (e) the total amount of solvent present is from about 20 to about 70 percent by weight based upon the weight of the epihalohydrin.

3. A process of claim 1 wherein
 (a) said epihalohydrin is employed in an amount which corresponds to from about 2 to about 20 moles of epihalohydrin per —OH, amine hydrogen atom and/or —COOH group;

TABLE I

| COMPONENT & PROPERTY | Run 1 | Run 2* | Run 3 | Run 4* | Run 5 | Run 6* | Run 7 | Run 8* | Run 9 | Run 10 | Run 11 |
|---|---|---|---|---|---|---|---|---|---|---|---|
| Novolac Resin, g | 96 | 96 | 120 | 120 | 120 | 120 | 134.4 | 96 | 96 | 96 | 96 |
| equiv. | 0.8 | 0.8 | 1.0 | 1.0 | 1.0 | 1.0 | 1.12 | 0.8 | 0.8 | 0.8 | 0.8 |
| Soft. point, °C. | 95 | 95 | 95 | 95 | 95 | 95 | 95 | 95 | 95 | 95 | 95 |
| Epi.[7], grams | 888 | 888 | 740 | 740 | 740 | 740 | 829 | 592 | 592 | 592 | 592 |
| equiv. | 9.6 | 9.6 | 8.0 | 8.0 | 8.0 | 8.0 | 8.96 | 6.4 | 6.4 | 6.4 | 6.4 |
| NaOH soln., g | 32 | 32 | 40 | 40 | 40 | 40 | 44 | 31.5 | 31.5 | 31.5 | 31.5 |
| equiv. | 0.8 | 0.8 | 1.0 | 1.0 | 1.0 | 1.0 | 1.10 | 0.79 | 0.79 | 0.79 | 0.79 |
| PGME[1], grams | 300 | 400 | 222 | 296 | 222 | 296 | 474 | 483 | 338 | 338 | — |
| t-AA[2], grams | — | — | — | — | — | — | — | — | — | — | 338 |
| DMSO[3], grams | 100 | — | 74 | — | 74 | — | 204 | — | — | — | 145 |
| DMA[4]$^{soln.}$, grams | — | — | — | — | — | — | — | — | 145 | — | — |
| MPD[5], grams | — | — | — | — | — | — | — | — | — | 145 | — |
| Reaction Temperature, °C. | 40 | 40 | 55 | 55 | 48 | 48 | 40 | 40 | 40 | 40 | 40 |
| % Epoxide | 23.26 | 23.14 | 23.13 | 22.94 | 23.27 | 23.22 | 22.9 | 22.8 | 22.9 | 22.9 | 22.8 |
| Hydrolyzable chloride, ppm[6] | 65 | 245 | 65 | 19 | 89 | 36 | 56 | 144 | 50 | 43 | 70 |
| Bound chloride, ppm[6] | 674 | 872 | 760 | 940 | 731 | 877 | 624 | 807 | 717 | 646 | 591 |
| Total chloride, ppm[6] | 739 | 1117 | 825 | 959 | 820 | 913 | 680 | 951 | 767 | 689 | 661 |

*Not an example of the present invention.
[1]Propylene glycol methyl ether.
[2]t-Amyl alcohol.
[3]Dimethylsulfoxide.
[4]N,N—Dimethylacetamide.
[5]1-Methyl-2-pyrrolidinone.
[6]Parts per million by weight.
[7]Epichlorohydrin.

What is claimed is:

1. In a process for the preparation of glycidyl derivatives of compounds containing at least one —OH, —NH$_2$ or —COOH group per molecule, which process (b) the reaction is conducted under a reduced atmosphere such that the distillate has a boiling point of from about 35° C. to about 65° C.;

(c) the alkali metal hydroxide is employed as an aqueous solution having a concentration of from about 20 to about 55 percent by weight and is added over a period of from about 4 to about 12 hours;

(d) the polar aprotic solvent is present in an amount which comprises from about 15 to about 50 percent by weight of the total weight of solvent present in the reaction mixture; and (e) the total amount of solvent present is from about 30 to about 60 percent by weight based upon the weight of the epihalohydrin; and (f) the solvent which is not a polar aprotic solvent is a glycol monoether.

4. A process of claim 1, 2 or 3 wherein said compound having at least one —OH, —NH₂ and/or —COOH group per molecule is a compound or mixture of compounds represented by the following formulas II–VII

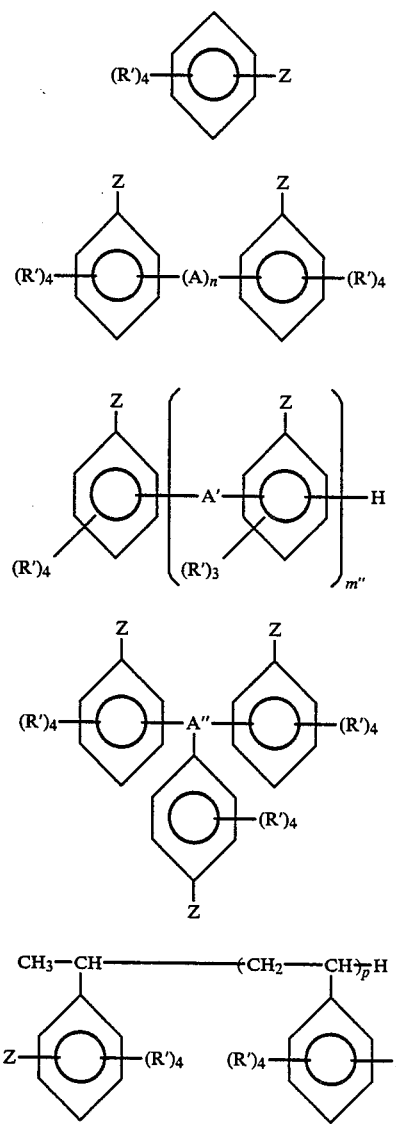

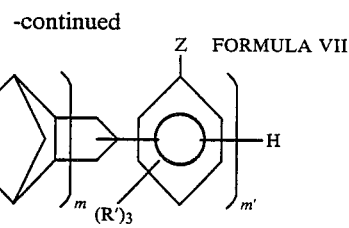

wherein each A is independently a divalent hydrocarbon group having from 1 to about 12 carbon atoms, —O—, —S—, —S—S—, —SO—, —SO₂— or —CO—; A' is a divalent hydrocarbon group having from 1 to about 12 carbon atoms; A" is a trivalent hydrocarbon group having from 1 to about 12 carbon atoms; each R' is independently hydrogen, a hydrocarbyl group having from 1 to about 10, preferably from 1 to about 4, carbon atoms, a halogen atom, preferably chlorine or bromine, an —OH, —NH₂ or —COOH group; each Z is independently an —OH, —NH₂ or —COOH group; m has an average value of from 1 to about 5; m' has an average value of from 1 to about 10; m" has an average value from about 1 to about 6; n has a value of zero or 1; and p has an average value of from about 1 to about 100; and said epihalohydrin is represented by the following formula I

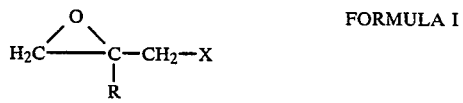

wherein R is hydrogen or a lower C₁ to C₄ alkyl group and X is a halogen, preferably chlorine or bromine.

5. A process of claim 4 wherein in formula I, R is hydrogen; and said compound containing at least one —OH, —NH₂ and/or —COOH group per molecule is represented by formulas II, III, IV and VII; wherein each A is a divalent hydrocarbon group; A' is a divalent hydrocarbon group having from 1 to about 6 carbon atoms; each R' is independently hydrogen, a hydrocarbyl group having from 1 to about 4 carbon atoms; each Z is independently —OH or —NH₂; m has an average value of from 1 to about 3; m' has an average value of from 1 to about 5; m" has an average value of from 1 to about 5; and p has an average value of from 2 to about 50.

6. A process of claim 5 wherein said compound containing at least one —OH or —NH₂ group per molecule is a phenol-formaldehyde novolac resin or a brominated derivative thereof, a cresol-formaldehyde novolac resin or a brominated derivative thereof, bisphenol A or a brominated derivative thereof, bisphenol F or a brominated derivative thereof, bisphenol K or a brominated derivative thereof, methylenedianiline or a combination thereof.

7. A process of claim 1, 2 or 3 wherein
(a) the polar aprotic solvent is dimethyl sulfoxide, dimethyl acetamide, N-methylpyrrolidinone, dimethylformamide, dimethylsulfone, tetramethyl urea, hexamethylphosphoramide, tetramethylene sulfone, or any combination thereof; and
(b) the other solvent is 1-butoxy-2-hydroxy ethane, 1-methoxy-2-hydroxy propane, 1-isobutoxy-2-hydroxy propane, 1-phenoxy-2-hydroxy propane, cyclohexanol, ethylene glycol monomethyl ether acetate, tert-amyl alcohol, tert-hexyl alcohol, methyl ethyl ketone, methyl isobutyl ketone, or any combination thereof.

8. A process of claim 4 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

9. A process of claim 5 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

10. A process of claim 6 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

11. In a process for the preparation of glycidyl derivatives of compounds containing one or more —OH, —NH$_2$ or —COOH groups per molecule, which process comprises reacting at least one compound having at least one —OH, —NH$_2$ or —COOH group per molecule with an excess of at least one epihalohydrin in the presence of an alkali metal hydroxide while (1) conducting the reaction in the presence of an organic solvent which does not react with any of the components in the reaction mixture and which codistills with water and said epihalohydrin at a boiling point below the boiling point of the lowest boiling compound among the components in the reaction mixture;
(2) conducting the reaction under a reduced pressure sufficient to provide a distillate with a boiling point suitably from about 30° C. to about 90° C.;
(3) employing said alkali metal hydroxide as an aqueous solution and adding said aqueous alkali metal hydroxide in a continuous or intermittent manner over a period of time of from about 0.5 to about 20 hours;
(4) maintaining the temperaure after completion of the addition of aqueous alkali metal hydroxide for a time such that the concentration of —OH, NH$_2$ and/or —COOH groups remaining in the reaction mixture is not greater than about 1 percent by weight based upon the total weight of —OH, —NH$_2$ and/or —COOH groups contained in the reactants containing —OH, —NH$_2$ and/or —COOH groups;
(5) continuously removing water by means of codistillation at a rate such that the water content in the reaction mixture is less than about 6 percent by weight based upon the weight of the reaction mixture;
(6) separating the water from the distillate and returning the solvent and epihalohydrin to the reaction mixture; and
(7) subsequently recovering the resultant glycidyl derivative by conventional means;

the improvement which comprises conducting the reaction in the presence of a mixture of solvents which codistill with the water and epihalohydrin, at least one of which solvents is a polar aprotic solvent; the amount of polar aprotic solvent employed is from about 5 to about 80 percent by weight of the total amount of solvents employed; and the total amount of solvent is from about 10 to about 100 percent by weight based upon the epihalohydrin.

12. A process of claim 11 wherein
(a) said epihalohydrin is employed in an amount which corresponds to from about 2 to about 30 moles of epihalohydrin per —OH, amine hydrogen atom and/or —COOH group;
(b) the reaction is conducted under a reduced atmosphere such that the distillate has a boiling point of from about 35° C. to about 65° C.;
(c) the alkali metal hydroxide is employed as an aqueous solution having a concentration of from about 10 to about 60 percent by weight and is added over a period of from about 2 to about 15 hours;
(d) the temperature is maintained after completion of the addition of aqueous alkali metal hydroxide for a time such that the concentration of —OH, —NH$_2$ or —COOH groups remaining in the reaction mixture is not greater than about 0.5 percent by weight based upon the total weight of —OH, —NH$_2$ and/or —COOH groups contained in the reactants containing —OH, —NH$_2$ and/or —COOH groups;
(e) water is continuously removed from the reaction mixture by codistillation at a rate such that the concentration of water in the reaction mixture is less than about 4 percent by weight based upon the weight of the reaction mixture;
(f) the polar aprotic solvent is present in an amount which comprises from about 10 to about 65 percent by weight of the total weight of solvent present in the reaction mixture; and
(g) the total amount of solvent present is from about 20 to about 70 percent by weight based upon the weight of the epihalohydrin.

13. A process of claim 11 wherein
(a) said epihalohydrin is employed in an amount which corresponds to from about 2 to about 20 moles of epihalohydrin per —OH, amine hydrogen atom and/or —COOH group;
(b) the reaction is conducted under a reduced atmosphere such that the distillate has a boiling point of from about 35° C. to about 65° C.; p1 (c) the alkali metal hydroxide is employed as an aqueous solution having a concentration of from about 20 to about 55 percent by weight and is added over a period of from about 4 to about 12 hours;
(d) the temperature is maintained after completion of the addition of aqueous alkali metal hydroxide for a time such that the concentration of —OH, —NH$_2$ or —COOH groups remaining in the reaction mixture is not greater than about 0.3 percent by weight based upon the total weight of —OH, —NH$_2$ and/or —COOH groups contained in the reactants containing —OH, —NH$_2$ and/or —COOH groups;
(e) water is continuously removed from the reaction mixture by codistillation at a rate such that the concentration of water in the reaction mixture is less than about 2 percent by weight based upon the weight of the reaction mixture;

(f) the polar aprotic solvent is present in an amount which comprises from about 15 to about 50 percent by weight of the total weight of solvent present in the reaction mixture; and (g) the total amount of solvent present is from about 30 to about 60 percent by weight based upon the weight of the epihalohydrin; and (h) the solvent which is not a polar aprotic solvent is a glycol monoether.

14. A process of claim 11, 12 or 13 wherein said compound having at least one —OH, —NH$_2$ and/or —COOH group per molecule is a compound or mixture of compounds represented by the following formulas II-VII

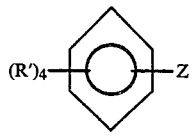
FORMULA II

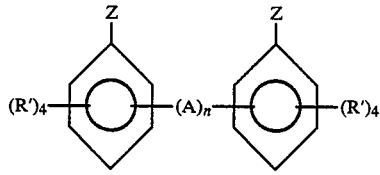
FORMULA III

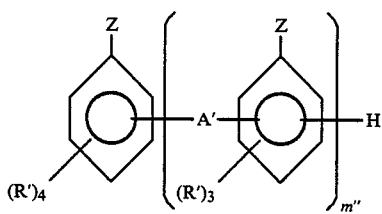
FORMULA IV

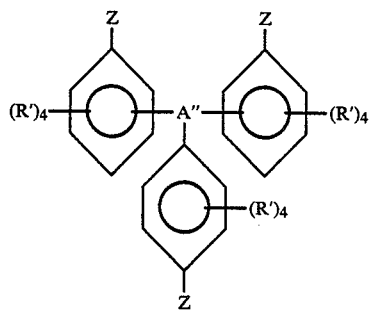
FORMULA V

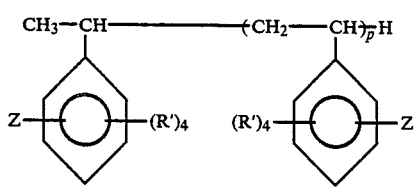
FORMULA VI

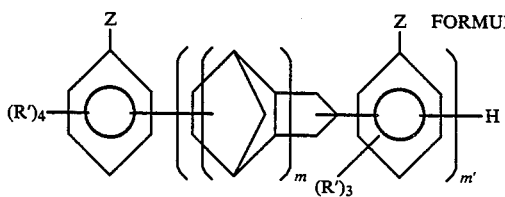
FORMULA VII wherein each A is independently a divalent hydrocarbon group having from 1 to about 12 carbon atoms, —O—, —S—, —S—S—, —SO—, —SO$_2$— or —CO—; A' is a divalent hydrocarbon group having from 1 to about 12 carbon atoms; A" is a trivalent hydrocarbon group having from 1 to about 12 carbon atoms; each R' is independently hydrogen, a hydrocarbyl group having from 1 to about 10, preferably from 1 to about 4, carbon atoms, a halogen atom, preferably chlorine or bromine, an —OH, —NH$_2$ or —COOH group; each Z is independently an —OH, —NH$_2$ or —COOH group; m has an average value of from 1 to about 5; m' has an average value of from 1 to about 10; m" has an average value from about 1 to about 6; n has a value of zero or 1; and p has an average value of from about 1 to about 100; and said epihalohydrin is represented by the following formula I

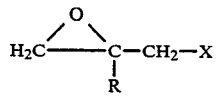
FORMULA I wherein R is hydrogen or a lower C$_1$ to C$_4$ alkyl group and X is a halogen, preferably chlorine or bromine.

15. A process of claim 14 wherein in formula I, R is hydrogen; and said compound containing at least one —OH, —NH$_2$ and/or —COOH group per molecule is represented by formulas II, III, IV and VII; wherein each A is a divalent hydrocarbon group; A' is a divalent hydrocarbon group having from 1 to about 6 carbon atoms; each R' is independently hydrogen, a hydrocarbyl group having from 1 to about 4 carbon atoms; each Z is independently —OH or —NH$_2$; m has an average value of from 1 to about 3; m' has an average value of from 1 to about 5; m" has an average value of from 1 to about 5; and p has an average value of from 2 to about 50.

16. A process of claim 15 wherein said compound containing at least one —OH or —NH$_2$ group per molecule is a phenol-formaldehyde novolac resin or a brominated derivative thereof, a cresol-formaldehyde novolac resin or a brominated derivative thereof, bisphenol A or a brominated derivative thereof, bisphenol F or a brominated derivative thereof, bisphenol K or a brominated derivative thereof, methylenedianiline or a combination thereof.

17. A process of claim 11, 12 or 13 wherein
(a) the polar aprotic solvent is dimethyl sulfoxide, dimethyl acetamide, N-methylpyrrolidinone, dimethylformamide, dimethylsulfone, tetramethyl urea, hexamethylphosphoramide, tetramethylene sulfone, or any combination thereof; and
(b) the other solvent is 1-butoxy-2-hydroxy ethane, 1-methyoxy-2-hydroxy propane, 1-isobutoxy-2-hydroxy propane, 1-phenoxy-2-hydroxy propane, cyclohexanol, ethylene glycol monomethyl ether acetate, tert-amyl alcohol, tert-hexyl alcohol, methyl ethyl ketone, methyl isobutyl ketone, or any combination thereof.

18. A process of claim 14 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

19. A process of claim 15 wherein
 (a) the polar aprotic solvent is dimethyl sulfoxide, dimethyl acetamide, N-methylpyrrolidinone, or any combination thereof; and
 (b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

20. A process of claim 16 wherein
 (a) the polar aprotic solvent is dimethyl sulfoxide, dimethyl acetamide, N-methylpyrrolidinone, or any combination thereof; and
 (b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

21. In a process for the preparation of glycidyl derivatives of compounds having at least one —OH, —NH$_2$ or —COOH group per molecule, which process comprises
 (A) continuously or incrementally adding an aqueous alkali metal hydroxide solution over a period of from about 0.5 to about 20 hours to a mixture containing (1) at least one compound containing at least one —OH, —NH$_2$ or —COOH group per molecule, (2) at least one epihalohydrin and (3) an organic solvent which codistills with water and epihalohydrin at a temperature below the boiling point of the lowest boiling compound among the components in the reaction mixture at the pressure employed or an organic solvent which has a boiling point above the temperature at which epihalohydrin and water codistill at the temperature and pressure employed;
 (B) conducting the reaction under a reduced pressure sufficient to provide a distillate with a boiling point of from about 30° C. to about 90° C. while continuously removing water by means of codistillation with epihalohydrin and solvent at a rate such that the water content in the reaction mixture is less than about 6 percent by weight;
 (C) separating the water from the distillate and returning the epihalohydrin and organic solvent to the reaction mixture;
 (D) drying the reaction mixture until the concentration of water is equal to or less than about 2 percent by weight;
 (E) removing any insoluble materials from the reaction mixture by any suitable mechanical solid separation means thereby forming a resin/epihalohydrin/organic solvent mixture essentially free of insoluble material;
 (F) washing the resin/epihalohydrin/organic solvent material with water so as to remove water soluble materials;
 (G) drying the resin/epihalohydrin/organic solvent mixture to a water content equal to or less than about 2 percent by weight; and
 (H) recovering the resultant epoxy resin from the resin/epihalohydrin/organic solvent mixture by any suitable means;
wherein the improvement resides in employing as the solvent for the reaction, a mixture consisting of
 (1) from about 20 to about 95 percent by weight of at least one solvent selected from the group consisting of (a) ketones, (b) glycol ethers, (c) glycol ether acetates, (d) aromatic hydrocarbons, (e) aliphatic hydrocarbons and (f) any combination of any two or more of such solvents; and
 (2) from about 5 to about 80 percent by weight of at least one polar aprotic solvent.

22. A process of claim 21 wherein
 (a) the reaction is conducted at a pressure such that the boiling point of the distillate is from about 30° C. to about 85° C.;
 (b) water is removed from the reaction mixture during the reaction of the epihalohydrin with the compound having at least one —OH, amine hydrogen atom or —COOH group per molecule at a rate such that the concentration of water in the reaction mixture is from about 0.3 to about 5 percent by weight;
 (c) the optional catalyst is not employed;
 (d) the reaction mixture is dried prior to removing any insoluble materials, step (D), to the extent that the concentration of water in the resin/epihalohydrin/organic solvent mixture is equal to or less than about 1.5 percent by weight;
 (e) the drying, step (G), which is performed after washing with water is conducted until the water content in the resin/epihalohydrin/organic solvent mixture is equal to or less than about 1.5 percent by weight; and
 (f) the glycidyl derivative is recovered from the resin/epihalohydrin/organic solvent mixture, step (H), by distilling the epihalohydrin and organic solvent from the glycidyl derivative.

23. A process of claim 22 wherein
 (a) the reaction is conducted at a pressure such that the boiling point of the distillate is from about 35° C. to about 75° C.;
 (b) water is removed from the reaction mixture during the reaction of the epihalohydrin with the compound having at least one —OH, —NH$_2$ or —COOH group per molecule at a rate such that the concentration of water in the reaction mixture is from about 0.5 to about 4 percent by weight;
 (c) the reaction mixture is dried prior to removing any insoluble materials, step (D), to the extent that the concentration of water in the resin/epihalohydrin/organic solvent mixture is equal to or less than about 1 percent by weight;
 (d) the drying, step (G), which is performed after washing with water is conducted until the water content in the resin/epihalohydrin/organic solvent mixture is equal to or less than about 1 percent by weight; and
 (e) the glycidyl derivative is recovered from the resin/epihalohydrin/organic solvent mixture, step (H), by distilling the epihalohydrin and organic solvent from the glycidyl derivative by means of a rotary evaporator or a falling film still.

24. A process of claim 23 wherein
 (a) the reaction is conducted at a pressure such that the boiling point of the distillate is from about 35° C. to about 65° C.;
 (b) water is removed form the reaction mixture during the reaction of the epihalohydrin with the compound having at least one —OH, —NH$_2$ or —COOH group per molecule at a rate such that the concentration of water in the reaction mixture is from about 0.8 to about 2 percent by weight;
 (c) the reaction mixture is dried prior to removing any insoluble materials, step (D), to the extent that the concentration of water in the resin/epihalohydrin/organic solvent mixture is equal to or less than about 0.2 percent by weight;

(d) the insoluble materials are removed, step (E), by filtration or centrifugation or a combination thereof; and (e) the drying, step (G), which is performed after washing with water is conducted until the water content in the resin/epihalohydrin/organic solvent mixture is equal to or less than about 0.2 percent by weight.

25. A process of claim 21, 22, 23 or 24 wherein said compound having at least one —OH, —NH$_2$ and/or —COOH group per molecule is a compound or mixture of compounds represented by the following formulas II-VII

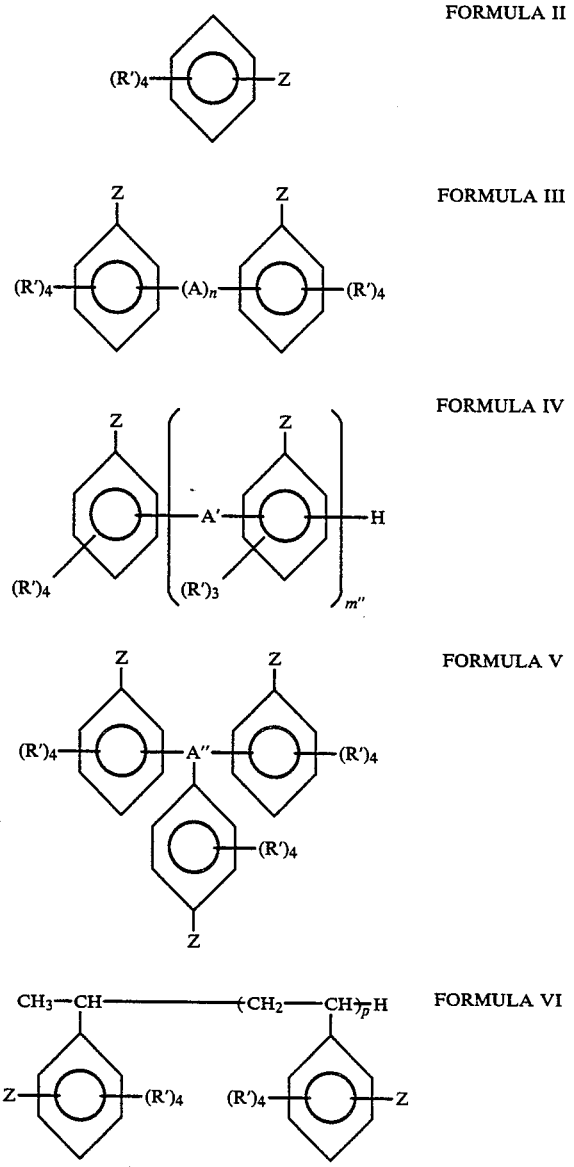

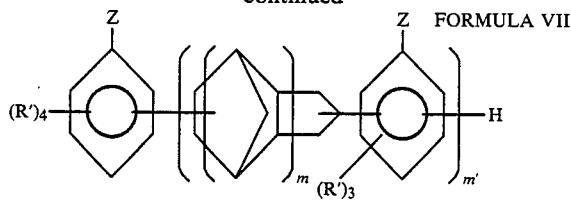

wherein each A is independently a divalent hydrocarbon group having from 1 to about 12 carbon atoms, —O—, —S—, —S—S—, —SO—, —SO$_2$— or —CO—; A' is a divalent hydrocarbon group having from 1 to about 12 carbon atoms; A" is a trivalent hydrocarbon group having from 1 to about 12 carbon atoms; each R' is independently hydrogen, a hydrocarbyl group having from 1 to about 10, preferably from 1 to about 4, carbon atoms, a halogen atom, preferably chlorine or bromine, an —OH, —NH$_2$ or —COOH group; each Z is independently an —OH, —NH$_2$ or —COOH group; m has an average value of from 1 to about 5; m' has an average value of from 1 to about 10; m" has an average value from about 1 to about 6; n has a value of zero or 1; and p has an average value of from about 1 to about 100; and said epihalohydrin is represented by the following formula I

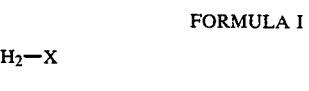

wherein R is hydrogen or a lower C$_1$ to C$_4$ alkyl group and X is a halogen, preferably chlorine or bromine.

26. A process of claim 25 wherein in formula I, R is hydrogen; and said compound containing at least one —OH, —NH$_2$ and/or —COOH group per molecule is represented by formulas II, III, IV and VII; wherein each A is a divalent hydrocarbon group; A' is a divalent hydrocarbon group having from 1 to about 6 carbon atoms; each R' is independently hydrogen, a hydrocarbyl group having from 1 to about 4 carbon atoms; each Z is independently —OH or —NH$_2$; m has an average value of from 1 to about 3; m' has an average value of from 1 to about 5; m" has an average value of from 1 to about 5; and p has an average value of from 2 to about 50.

27. A process of claim 26 wherein said compound containing at least one —OH or —NH$_2$ group per molecule is a phenol-formaldehyde novolac resin or a brominated derivative thereof, a cresol-formaldehyde novolac resin or a brominated derivative thereof, bisphenol A or a brominated derivative thereof, bisphenol F or a brominated derivative thereof, bisphenol K or a brominated derivative thereof, methylenedianiline or a combination thereof.

28. A process of claim 21, 22, 23 or 24 wherein
(a) the polar aprotic solvent is dimethyl sulfoxide, dimethyl acetamide, N-methylpyrrolidinone, dimethylformamide, dimethylsulfone, tetramethyl urea, hexamethylphosphoramide, tetramethylene sulfone, or any combination thereof; and
(b) the other solvent is 1-methoxy-2-hydroxy propane, 1-phenoxy-2-hydroxy propane, cyclohexanol, ethylene glycol monomethyl ether acetate, tert-amyl alcohol, tert-hexyl alcohol, methyl ethyl ketone, methyl isobutyl ketone, or any combination thereof.

29. A process of claim 25 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

30. A process of claim 26 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

31. A process of claim 27 wherein
(a) the polar aprotic solvent is dimethyl sulfoxide, dimethyl acetamide, N-methylpyrrolidinone, or any combination thereof; and
(b) the other solvent is 1-methoxy-2-hydroxy propane, 1-butoxy-2-hydroxy ethane, 1-isobutoxy-2-hydroxy propane, 1-phenoxy-2-hydroxy propane, cyclohexanol, tert-amyl alcohol, tert-hexyl alcohol or any combination thereof.

* * * * *